US012374816B2

(12) United States Patent
Racho et al.

(10) Patent No.: US 12,374,816 B2
(45) Date of Patent: Jul. 29, 2025

(54) ELECTRICAL ASSEMBLY

(71) Applicant: Lear Corporation, Southfield, MI (US)

(72) Inventors: Edgar Michael T. Racho, Lapu-Lapu (PH); Albert M. Cabañero, Cebu (PH)

(73) Assignee: Lear Corporation, Southfield, MI (US)

( * ) Notice: Subject to any disclaimer, the term of this patent is extended or adjusted under 35 U.S.C. 154(b) by 353 days.

(21) Appl. No.: 17/991,324

(22) Filed: Nov. 21, 2022

(65) Prior Publication Data

US 2024/0170874 A1 May 23, 2024

(51) Int. Cl.

*H01R 12/79* (2011.01)
*H01R 12/61* (2011.01)
*H01R 13/24* (2006.01)
*H01R 13/506* (2006.01)

(52) U.S. Cl.

CPC ........... *H01R 12/79* (2013.01); *H01R 12/616* (2013.01); *H01R 13/24* (2013.01); *H01R 13/506* (2013.01)

(58) Field of Classification Search

CPC ...... H01R 12/79; H01R 12/616; H01R 13/24; H01R 13/506; H01R 12/714; H01R 12/721; H01R 12/68; H01R 13/02; H01R 13/502

See application file for complete search history.

(56) References Cited

U.S. PATENT DOCUMENTS

| | | | |
|---|---|---|---|
| 3,924,917 A | 12/1975 | Munshower | |
| 4,066,319 A | 1/1978 | Baker | |
| 4,357,065 A | 11/1982 | Kam | |
| 4,737,118 A | 4/1988 | Lockard | |
| 6,439,921 B1 * | 8/2002 | Hio | H01R 12/68 439/422 |
| 6,746,269 B1 | 6/2004 | Casses | |
| 7,040,917 B2 | 5/2006 | Yagi | |
| 7,338,310 B2 | 3/2008 | Kumakura | |
| 7,367,837 B2 | 5/2008 | Pabst | |
| 7,467,970 B2 | 12/2008 | Ikuta | |
| 7,581,979 B2 | 9/2009 | Kumakura | |

(Continued)

FOREIGN PATENT DOCUMENTS

| | | |
|---|---|---|
| EP | 1530263 A1 | 5/2005 |
| JP | 5134098 B2 | 1/2013 |

OTHER PUBLICATIONS

Co-pending application 17/895, 194, filed Aug. 25, 2022.
https://www.grainger.com/product/WINLAND-ELECTRONICS-Flat-Cable-Splice-Kit-33UL37, available at least as early as Mar. 2022.

*Primary Examiner* — Briggitte R. Hammond
(74) *Attorney, Agent, or Firm* — Fishman Stewart PLLC

(57) ABSTRACT

An assembly includes a housing, a flat cable, and a spring terminal, in some configurations. The flat cable may be disposed at least partially in the housing and may include an electrical conductor. The spring terminal may be disposed at least partially in the housing. The spring terminal may include a base, a first wing extending from the base in a first direction, a second wing spaced apart from the first wing, a spring portion extending from the base in a second direction, and a tab extending from the base. The first wing and the second wing may extend through the flat cable such that the spring terminal is electrically connected to the electrical conductor. The spring portion may connect with an external electrical component such that the external electrical component is electrically connected to the electrical conductor.

20 Claims, 22 Drawing Sheets

(56) References Cited

U.S. PATENT DOCUMENTS

| | | | |
|---|---|---|---|
| 8,672,704 | B2 | 3/2014 | De Bruijn |
| 8,702,443 | B2 * | 4/2014 | Kajiura .................. H01R 12/68 439/422 |
| 9,343,805 | B2 * | 5/2016 | Baan Hofman ... H01R 13/2478 |
| 10,431,906 | B1 | 10/2019 | Reed |
| 11,191,180 | B2 | 11/2021 | Palomo Lorenzo et al. |
| 2019/0173219 | A1 | 6/2019 | Sakai |

* cited by examiner

ELECTRICAL ASSEMBLY

TECHNICAL FIELD

The present disclosure generally relates to electrical assemblies including spring terminals and flat cables that may, for example, be utilized in connection with and/or incorporated into vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
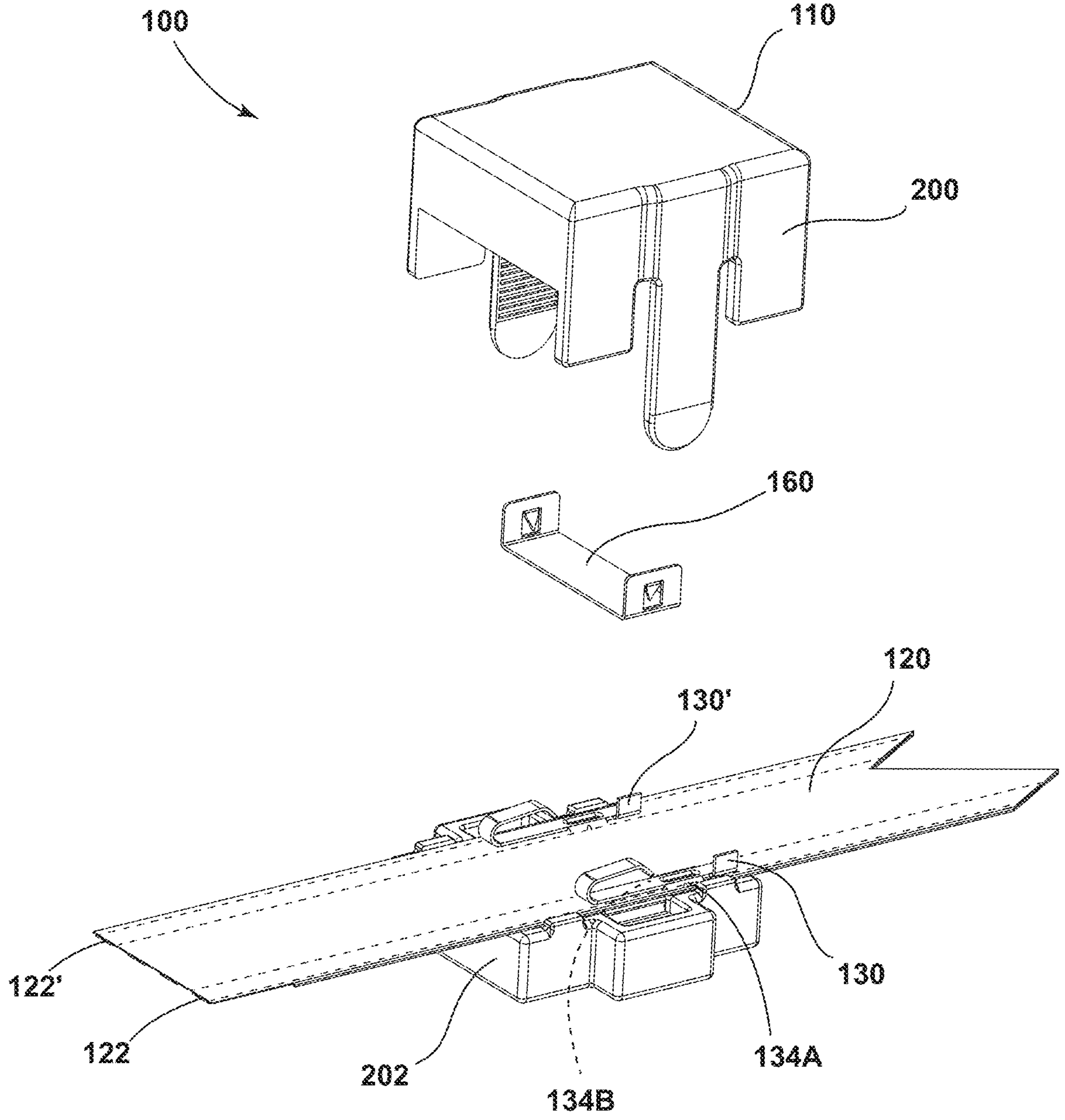
FIG. 1 is an exploded perspective view generally illustrating an embodiment of an electrical assembly according to teachings of the present disclosure.
Figure 2:
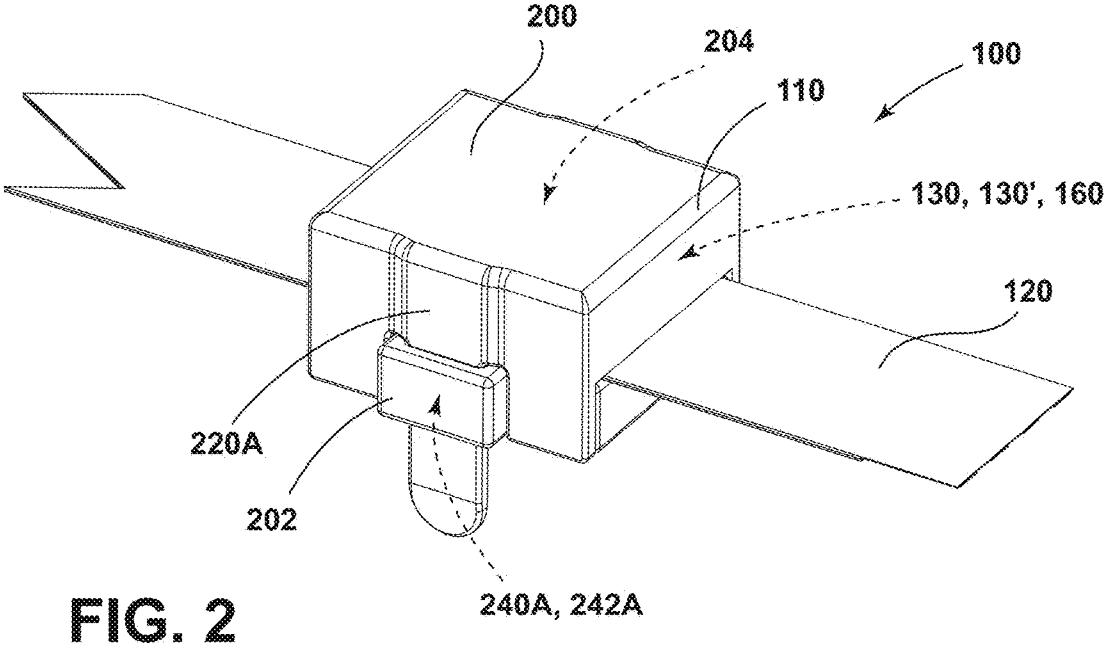
FIGS. 2 and 3 are a perspective view and a cross-sectional perspective view, respectively, generally illustrating embodiments of an electrical assembly according to teachings of the present disclosure.
Figure 3:
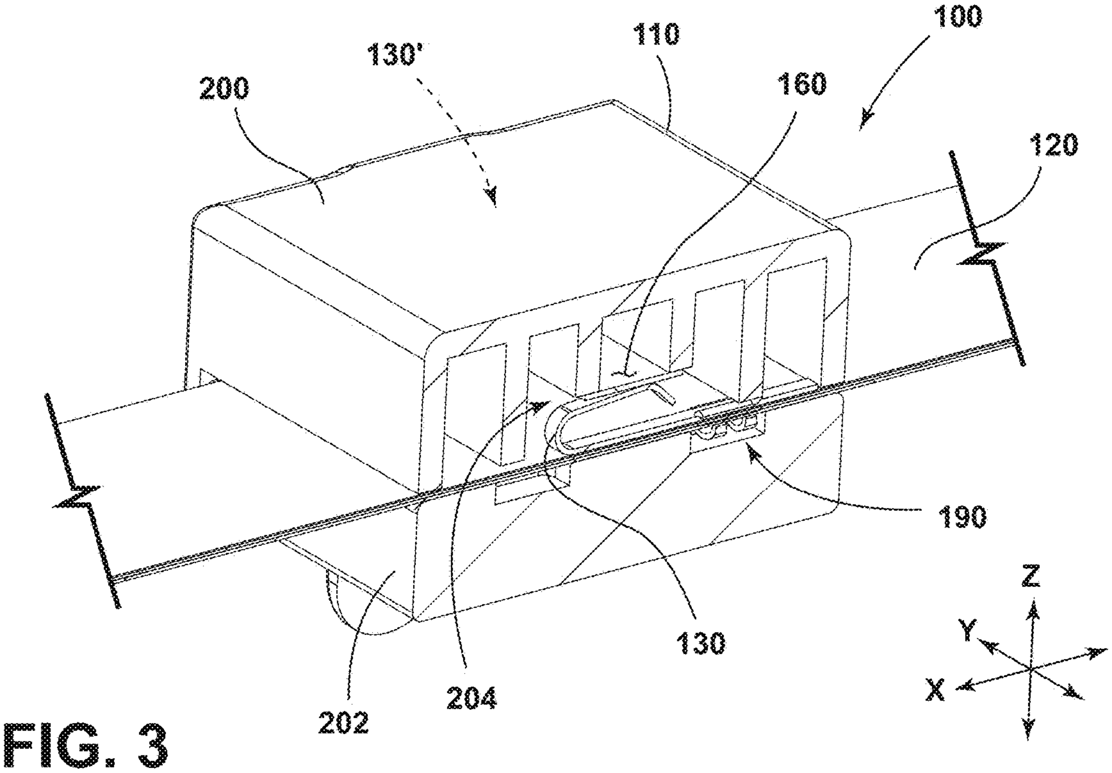

FIGS. 1-3 present an embodiment of an electrical assembly 100 including a housing 110, a cable 120, and/or at least one spring terminal 130. The housing 110 and/or the spring terminal 130 are configured for connection with the cable 120. The cable 120 (e.g., a flat flexible cable (FFC)) includes at least one electrical conductor 122. In some embodiments, the spring terminal 130 includes a base 132, a first wing 134A extending from the base in a first direction 136, a second wing 134B spaced apart from the first wing 134A, a spring portion 138 extending from the base 132 in a second direction 140, and/or a tab 142 (see, e.g., FIGS. 4 and 5). In the assembled configuration, the flat cable 120 and/or the spring terminal 130 are at least partially disposed in the housing 110 (see, e.g., FIG. 3). The first wing 134A and the second wing 134B of the spring terminal 130 extend into and/or through the flat cable 120 such that the spring terminal 130 is electrically connected to the electrical conductor 122 (see, e.g., FIGS. 1 and 7). The spring portion 138 of the spring terminal 130 connects with an electrical component (e.g., busbar 160) such that the electrical component is electrically connected to the electrical conductor 122 of the flat cable 120.

Figure 4:
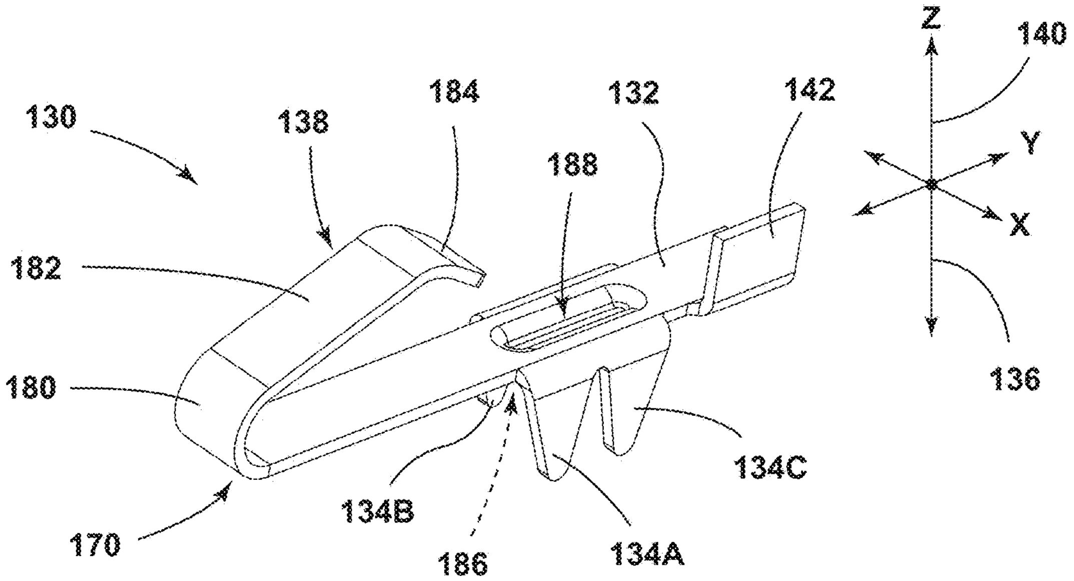
FIGS. 4-6 are perspective views generally illustrating embodiments of a spring terminal of an electrical assembly according to teachings of the present disclosure.
Figure 5:
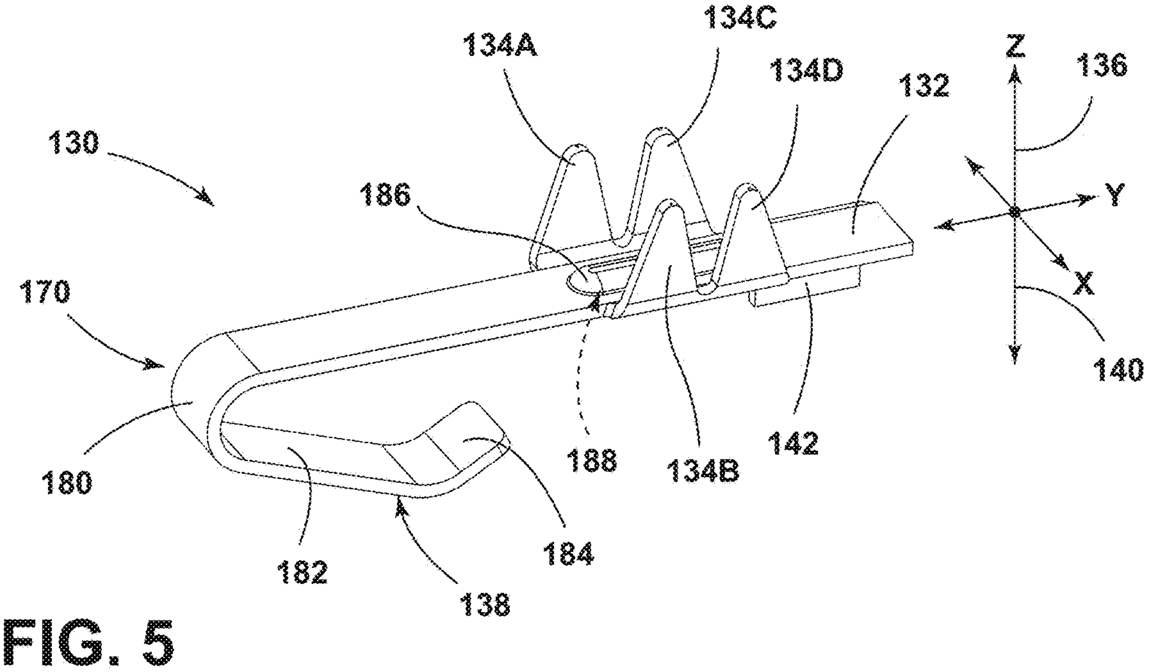
Figure 6:
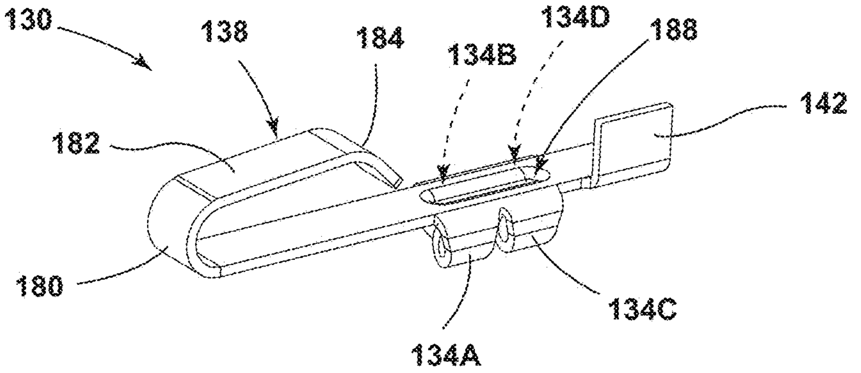

Referring now to the embodiment shown in FIGS. 4-6, a spring terminal 130 includes a spring portion 138 that extends from a first end 170 of the base 132, and/or a tab 142 that is located proximate a second end 172 of the base 132.

The spring portion 138 includes a first curved portion 180, a planar portion 182, and/or a second curved/angled portion 184. The planar portion 182 is disposed between the first curved portion 180 and the second curved portion 184. The spring portion 138 is configured to move (e.g., pivot) relative to the base 132, with the first curved portion 180 acting as a hinge. The tab 142 may include a rectangular configuration. The tab 142 extends perpendicular to the base 132 parallel to an X-Z plane. In some configurations, the tab 142 is not crimped or otherwise modified after initial formation. In some implementations, the spring terminal 130 includes a third wing 134C and/or a fourth wing 134D. The third wing 134C is disposed adjacent the first wing 134A, and/or the fourth wing 134D disposed adjacent the second wing 134B and spaced apart from the third wing 134C in a Y-direction (e.g., on opposite sides of the body 132). The wings 134A-134D are disposed axially between the spring portion 138 and the tab 142. The wings 134A-134D may include triangular configurations. The wings 134A-134D are configured to be crimped (see, e.g., FIG. 6) such that, in an assembled configuration, the spring terminal 130 is connected to the flat cable 120 and/or is electrically connected with an electrical conductor 122. The spring terminal 130 may include more or less than four wings. The base 132 includes a protrusion 186 and/or a recess 188 that corresponds to the protrusion 186. The protrusion 186 extends in the first direction 136, generally parallel to the wings 134A-D prior to crimping. The recess 188 is disposed on an opposite side of the base 132 from the protrusion 186. Referring now to FIG. 3, in the assembled configuration, the wings 134A-134D are at least partially disposed in a recess 190 of housing 110 such that axial movement of the spring terminal 130 relative to the housing 110 is restricted. The wings 134A-134D extend through the flat cable 120 and are crimped to connect the spring terminal 130 to the flat cable 120 (see, e.g., FIG. 7).

Figure 7:
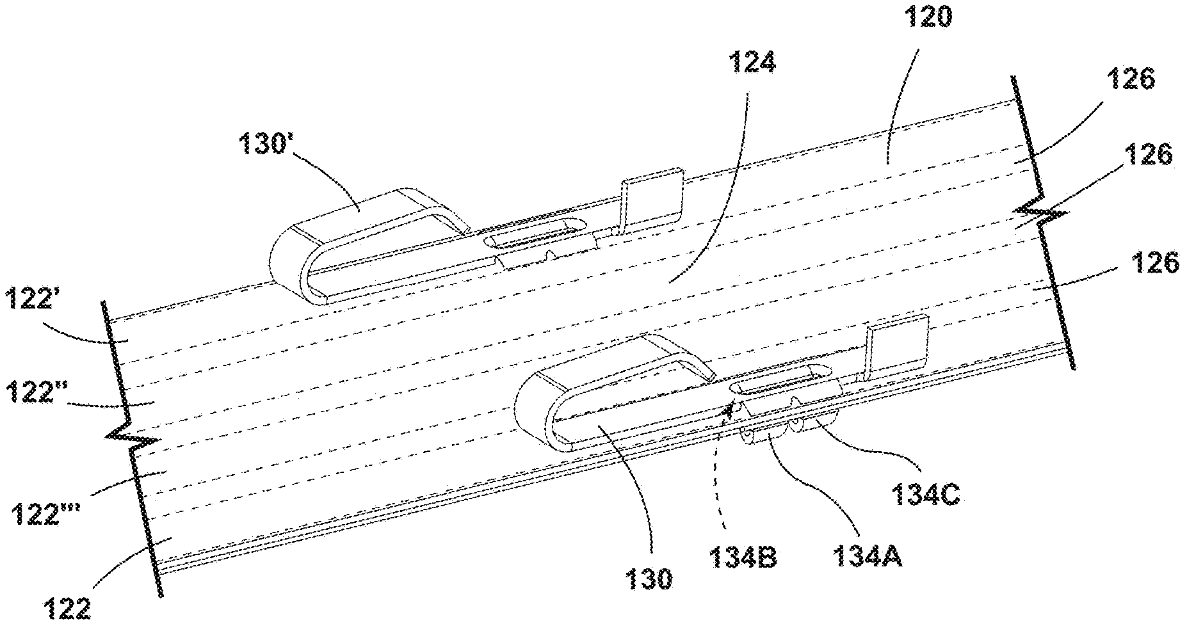
FIG. 7 is perspective view generally illustrating embodiments spring terminals and a flat cable of an electrical assembly according to teachings of the present disclosure.

With reference to FIG. 7, a flat cable 120 includes an elongated body 124 having one or more electrical conductors 122 (e.g., electrical conductors 122, 122', 122", 122'") and/or an insulating material 126 that may electrically insulate the conductors 122 from each other and/or other components. The one or more conductors 122 may be disposed in parallel with each other and/or may be substantially aligned with a common plane. The one or more conductors 122 may, in some configurations, be integrally formed with the insulating material 126 (e.g., the insulating material may be formed/molded around the one or more conductors 122).

Referring now to FIGS. 1-3, the electrical assembly 100 further includes a second spring terminal 130' and/or a busbar 160. In an assembled configuration, the second spring terminal 130' is connected to the flat cable 120 and/or is electrically connected to an additional electrical conductor 122'. In some examples, the housing 110 includes a first cover 200 and a second cover 202. The first cover 200 is configured for connection with the second cover 202 and/or the busbar 160. The second cover 202 is configured for connection with the first cover 200. The busbar 160 is configured for connection with the first cover 200. In the assembled configuration, the first cover 200 and the second cover 202 collectively provide an internal cavity 204. The busbar 160, the spring terminal 130, the second spring terminal 130', and/or a portion of the flat cable 120 are disposed in the internal cavity 204. The busbar 160 electrically connects the spring terminal 130 with the second spring terminal 130' such that the electrical conductor 122 is electrically connected to the additional electrical conductor 122' (e.g., the electrical assembly 100 may be configured as a splice connector).

Figure 8:
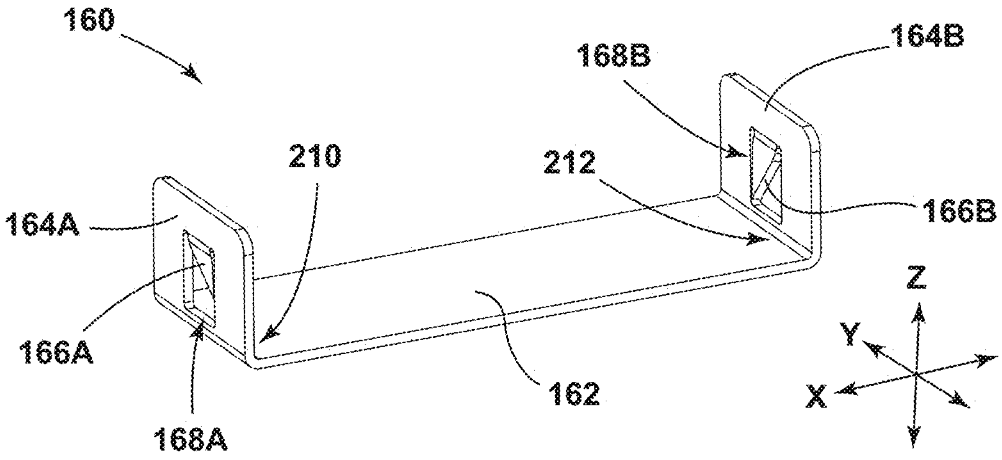
FIG. 8 is perspective view generally illustrating an embodiment of a busbar of an electrical assembly according to teachings of the present disclosure.
Figure 9:
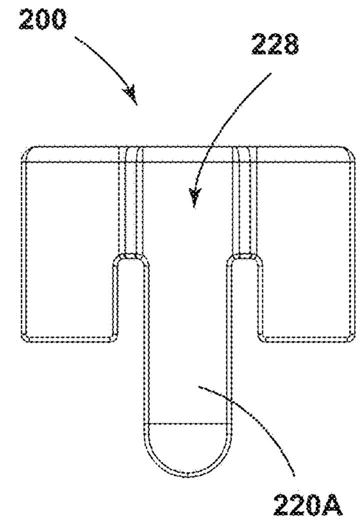
FIG. 9 is a side view generally illustrating an embodiment of a housing of an electrical assembly according to teachings of the present disclosure.
Figure 10:
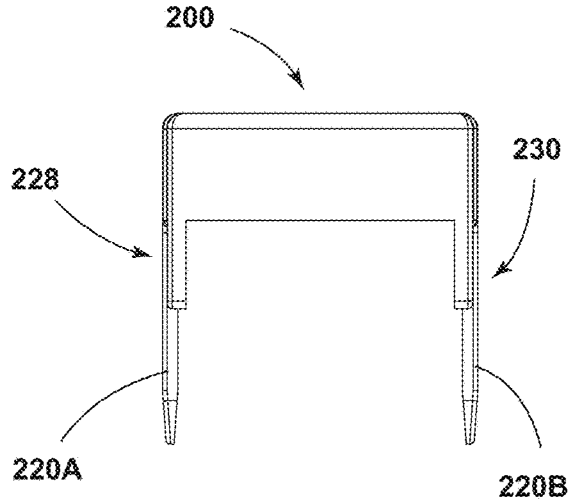
FIG. 10 is a front view generally illustrating an embodiment of a housing of an electrical assembly according to teachings of the present disclosure.
Figure 11:
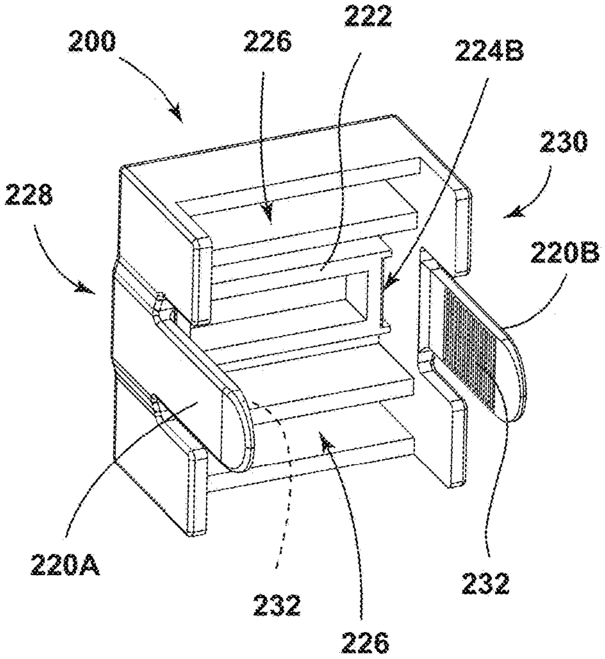
FIG. 11 is a perspective view generally illustrating an embodiment of a housing of an electrical assembly according to teachings of the present disclosure.
Figure 12:
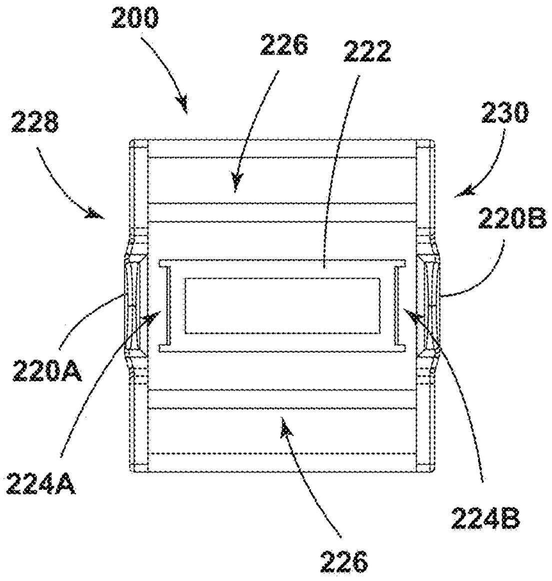
FIG. 12 is a bottom view generally illustrating an embodiment of a housing of an electrical assembly according to teachings of the present disclosure.

With reference to the embodiment of FIG. 8, a busbar 160 includes an elongated base 162, a first projection 164A, a second projection 164B, a first protrusion 166A, and/or a second protrusion 166B. The first projection 164A extends perpendicularly from a first end 210 of the base 162, and/or the second projection 164B extends perpendicularly from a second end 212 of the base 162. The first projection 164A and the second projection 164B extend from the base 162 in the same direction. The first projection 164A includes a first void 168A and/or the second projection 164B includes a second void 168B. The first protrusion 166A extends from the first projection 164A proximate the first void 168A and/or the second protrusion 166B extends from the second projection 164B proximate the second void 168B. The first protrusion 166A and/or the second protrusion 166B may include triangular configurations.

Referring now to FIGS. 9-12, a first cover 200 includes a first extension 220A, a second extension 220B, an internal structure 222 defining a first cavity 224A and a second cavity 224B, and/or at least one channel 226. The first extension 220A is disposed proximate a first end 228 of the first cover 200 and/or the second extension 220B is disposed proximate a second end 230 of the first cover 200. The first extension 220A and the second extension 220B are configured to engage the second cover 202 such that the first cover 200 is connected to the second cover 202. In some implementations, the first extension 220A and the second extension 220B include teeth or serrations 232 (see, e.g., FIG. 11). The busbar 160 connects with the internal structure 222. In an assembled configuration, the first projection 164A of the busbar 160 is disposed in the first cavity 224A of the first cover 200, the first protrusion 166A of the busbar 160 engages the internal structure 222 or an additional portion of the first cover 200, the second projection 164B of the busbar 160 is disposed in the second cavity 224B of the first cover 200, and/or the second protrusion 166B of the busbar 160 engages the internal structure 222 or an additional portion of the first cover 200. In the assembled configuration, a tab 142 of the spring terminal 138 is disposed in a channel 226 of the internal structure 222.

Figure 13:
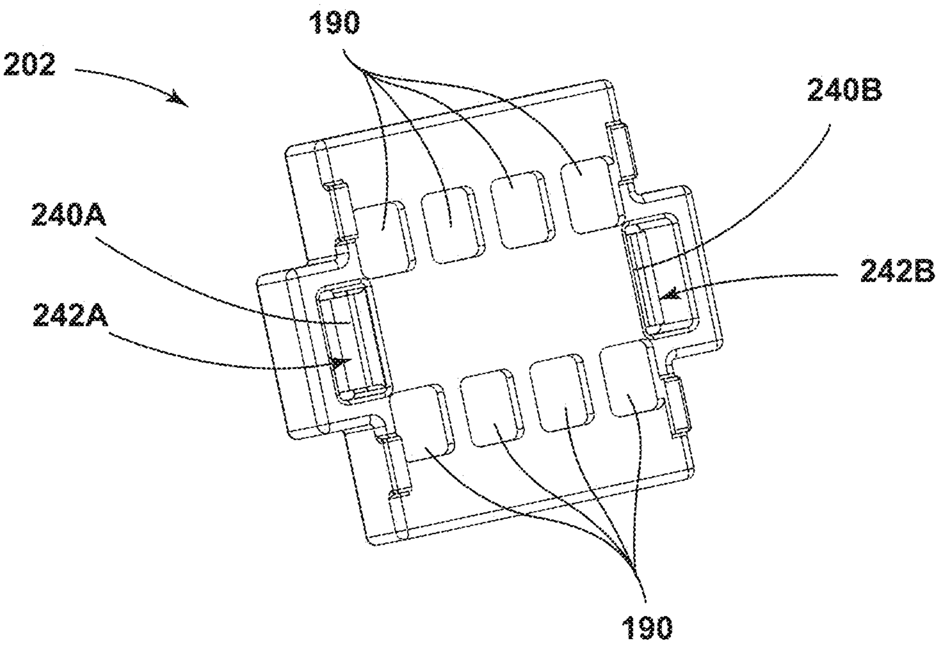
FIGS. 13 and 14 are perspective views generally illustrating an embodiment of a housing of an electrical assembly according to teachings of the present disclosure.
Figure 14:
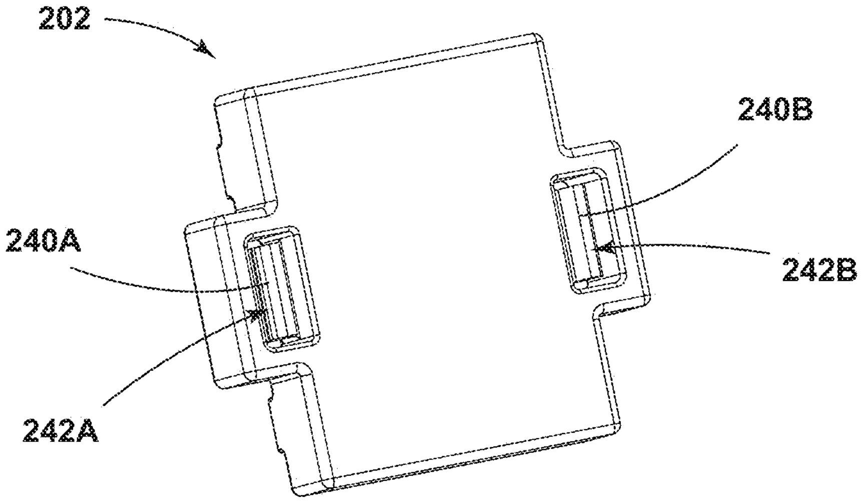

With reference to FIGS. 13 and 14, a second cover 202 includes one or more recesses 190, a first attachment formation 240A (e.g., a locking tab) disposed in a first hole 242A, and/or a second attachment formation 240B (e.g., a locking tab) disposed in a second hole 242B. In an assembled configuration, the first cover 200 is connected to the second cover 202 such that a portion of the first extension 220A of the first cover 200 is disposed in the first hole 242A, the first extension 220A engages the first attachment formation 240A, a portion of the second extension 220B of the first cover 200 is disposed in the second hole 242B, and/or the second extension 220B engages the second attachment formation 240B (see, e.g., FIG. 2). For example, the attachment formations 240A-B may engage teeth/serrations 232 of the extensions 220A-B. A portion of a spring terminal 130 (e.g., wings 134A-D) is disposed in a recess 190. For example, some or each of wings 134A-D (e.g., after crimping) may extend downward in a Z-direction into a recess 190 such that axial movement of the spring terminal 130 is restricted via contact between the wings 130A-D and the recess 190.

Figure 15:
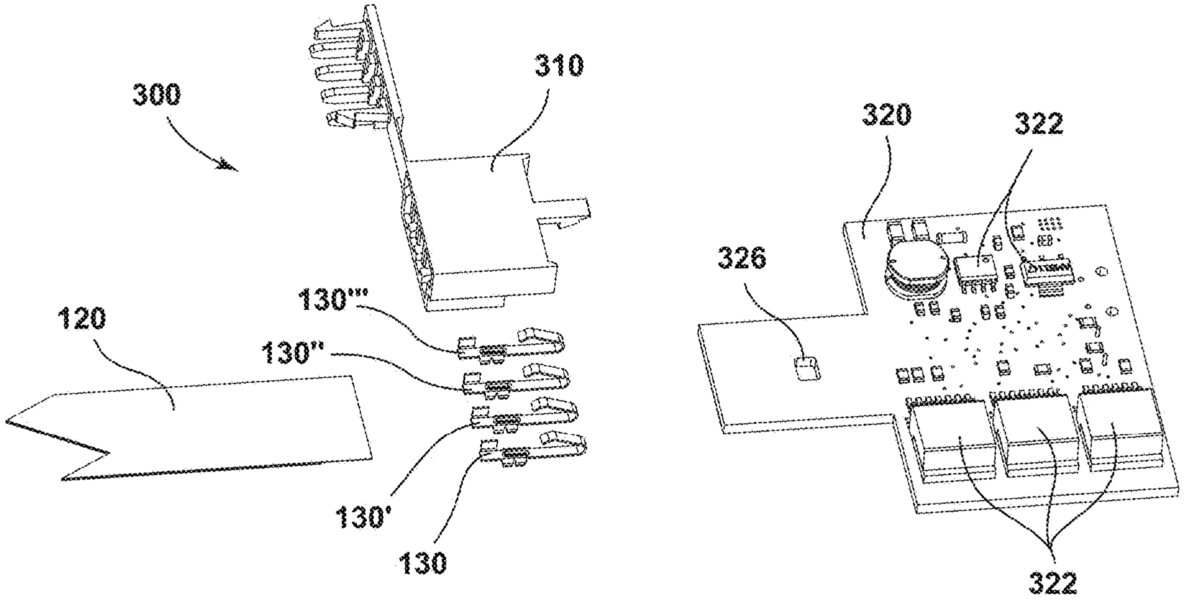
FIG. 15 is an exploded perspective view generally illustrating an embodiment of an electrical assembly according to teachings of the present disclosure.
Figure 16:
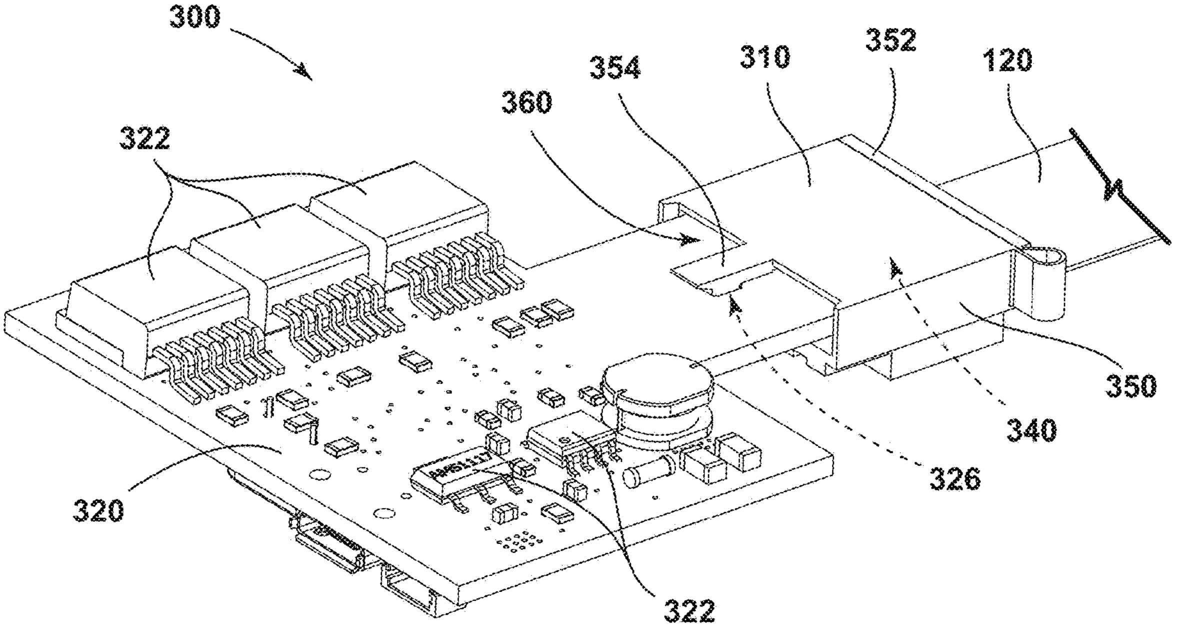
FIGS. 16 and 17 are perspective views generally illustrating an embodiment of an electrical assembly according to teachings of the present disclosure.
Figure 17:
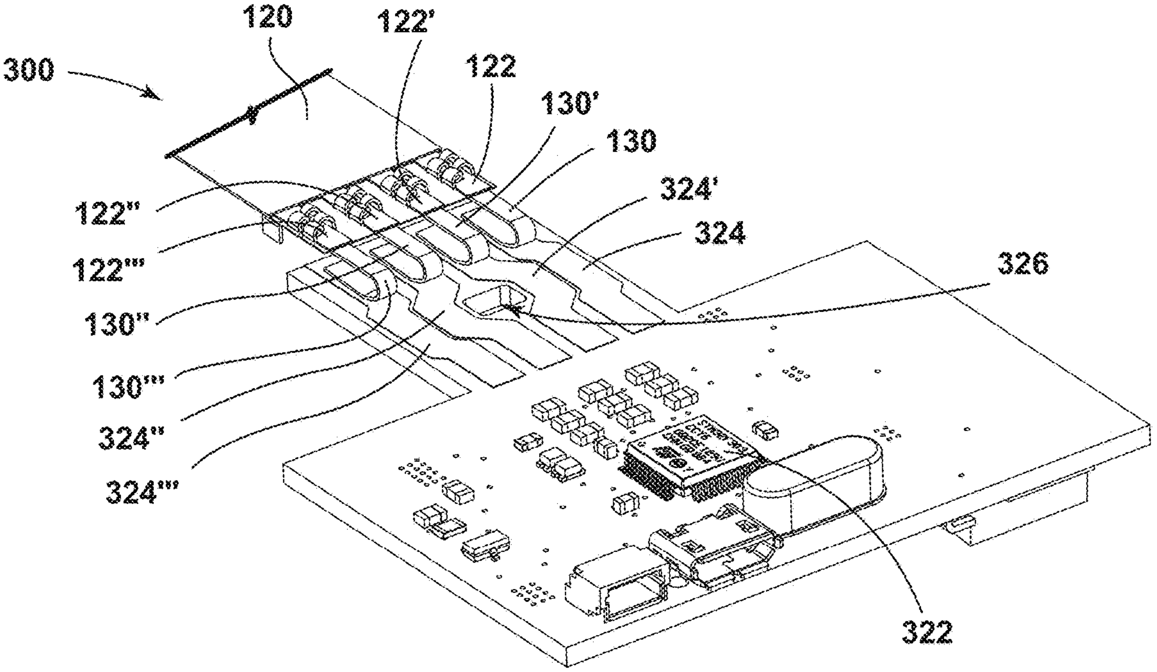

FIGS. 15-17 present an embodiment of an electrical assembly 300 including a housing 310, a circuit board 320, a flat cable 120, and/or a plurality of spring terminals 130

(e.g., spring terminals 130, 130', 130'', 130'''). The structure and function of the electrical assembly 300 may include features that are substantially similar to that of the electrical assembly 100. Accordingly, the structure and/or function of similar features will not be described again in detail.

The housing 310 is configured for connection with the circuit board 320 and/or the flat cable 120. The circuit board 320 (e.g., a printed circuit board (PCB)) includes one or more electrical components 322 (e.g., microcontrollers, capacitors, resistors, etc.), a plurality of exposed conductors 324 (e.g., exposed conductors 324, 324', 324'', 324'''), and/or a recess 326. An exposed conductor 324 (e.g., a PCB trace) is electrically connected to at least one electrical component 322. In an assembled configuration, a portion of the circuit board 320, the spring terminals 130, 130', 130'', 130''', and a portion of the flat cable 120 are disposed in an internal cavity 340 of the housing 310 (see, FIG. 16). A spring terminal 130 (e.g., the spring portion 138) is in contact with an exposed conductor 324 such that an electrical conductor 122 of the flat cable 120 is electrically connected to an electrical component 322 via the spring terminal 130 (see, e.g., FIG. 17). The electrical assembly 300 is shown including four spring terminals 130 and four exposed conductors 324, however the electrical assembly 300 may include more or less than four spring terminals 130 and/or more or less than four exposed conductors 324.

With reference to FIGS. 16 and 18-21, a housing 310 includes a first portion 350, a second portion 352, and/or a projection/latch 354. The first portion 350 is configured for connection with the flat cable 120, the circuit board 320, and/or the second portion 352. The second portion 352 is configured for connection with the first portion 350. In some instances, the second portion 352 is formed integrally with the first portion 350 (see, e.g., FIG. 20). In other instances, the second portion 352 is a separate component than the first component 350 (see, e.g., FIG. 21). The projection/latch 354 extends from the from the first portion 350. In an assembled configuration, the projection/latch 354 is at least partially disposed in the recess 326 of the circuit board 320 such that the housing 310 is connected to the circuit board 320 to restrict movement of the housing 310 relative to the circuit board 320.

Referring now to FIGS. 20-23, the first portion 350 of the housing 310 includes a slot 360 accessible via a first end 370 of the first portion 350 and/or one or more channels 362 accessible via a second end 372 of the first portion 350. The slot 360 receives a portion of the circuit board 320 (see, e.g., FIGS. 16 and 19). A channel 362 receives a spring terminal 130, a portion of the flat cable 120, and/or a part of the second portion 352 of the housing 310 (see, e.g., FIGS. 18 and 19). The first portion includes 350 includes one or more inner tabs 380. An inner tab 380 is disposed in each channel 362 and/or provided for each spring terminal 130. An inner tab 380 includes a tapered and resilient configuration, such as to facilitate insertion and retention of a spring terminal 130. For example, during insertion of a spring terminal 130, the inner tab 380 may deflect downward (as shown in FIG. 19), at least to some degree, to facilitate wings 134A-D moving into a recess 390 that may be defined at partially by the inner tab 380 Similar to the recess(es) 190 of the housing 110, a recess 390 may receive wings 134A-D of a spring terminal 130, and/or may restrict movement of the terminal 130 relative to the housing 310. The first portion 350 the housing is shown including four channels 362 and four inner tabs 380, however the first portion 350 may include more or less than four channels 362 and/or more or less than four inner tabs 380.

Figure 18:
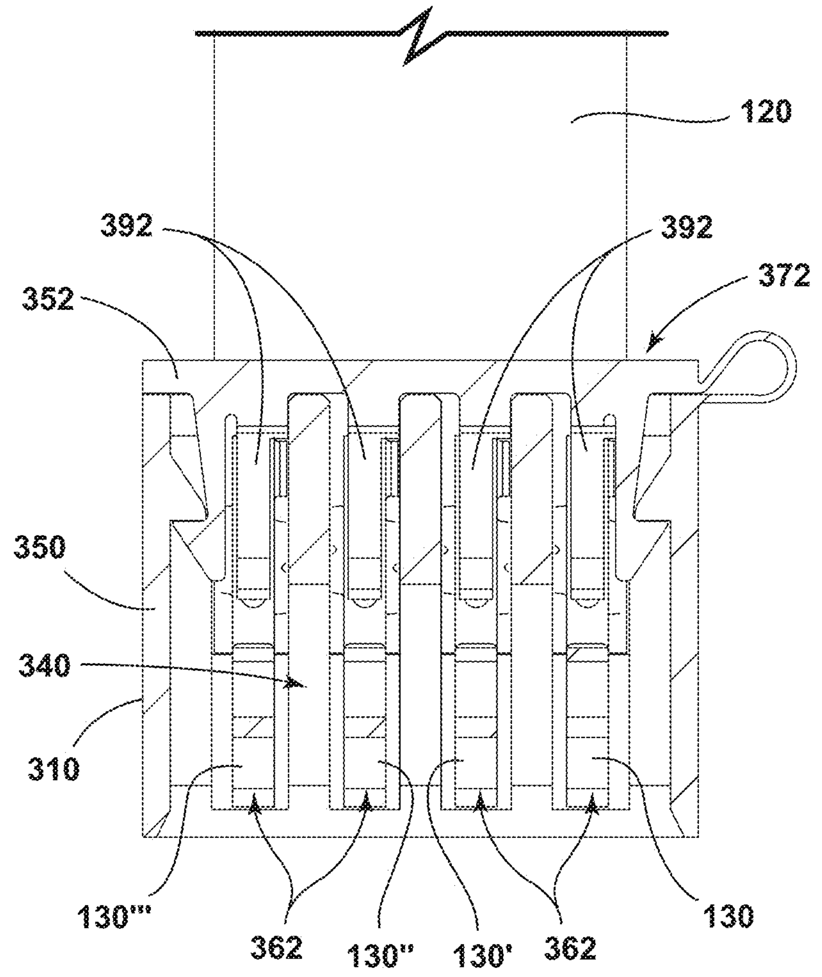
FIGS. 18 and 19 are cross-sectional views generally illustrating an embodiment of an electrical assembly according to teachings of the present disclosure.
Figure 19:
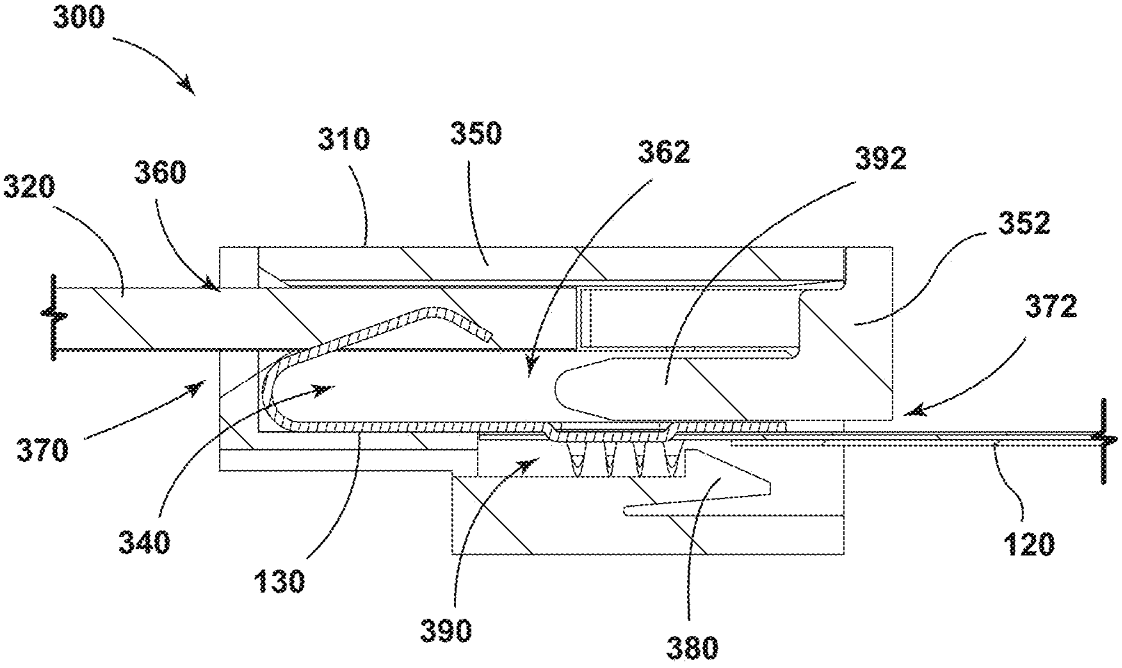
Figure 20:
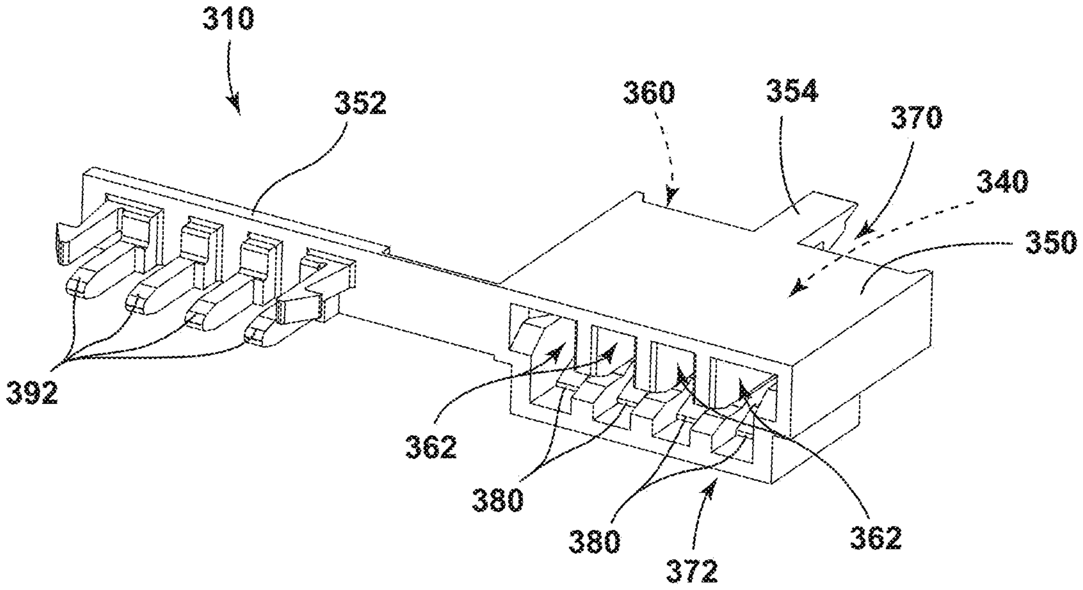
FIGS. 20-23 are perspective views generally illustrating an embodiment of a housing of an electrical assembly according to teachings of the present disclosure.
Figure 21:
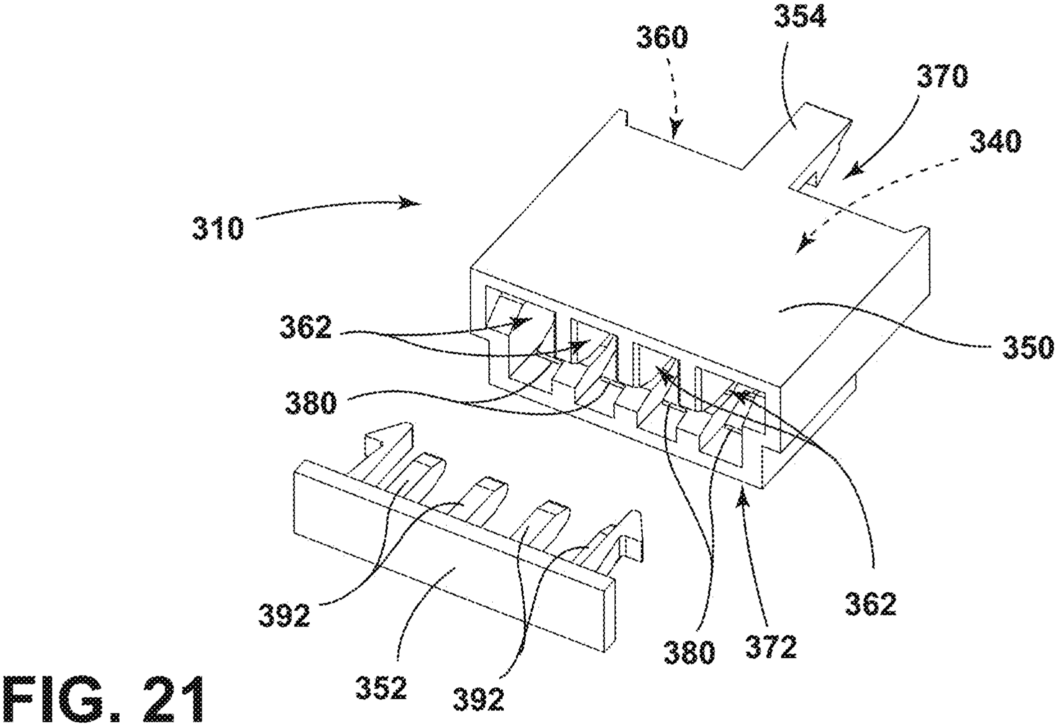
Figure 22:
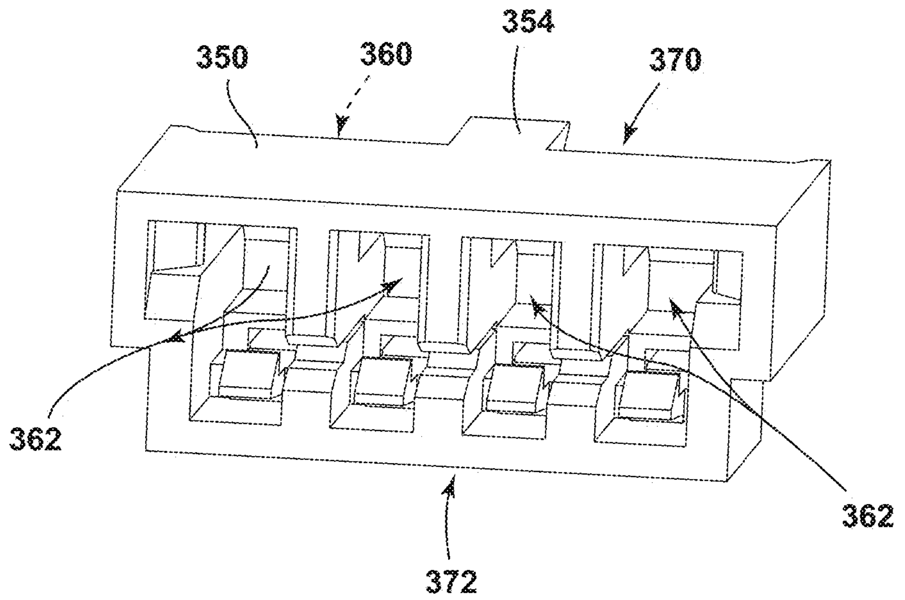
Figure 23:
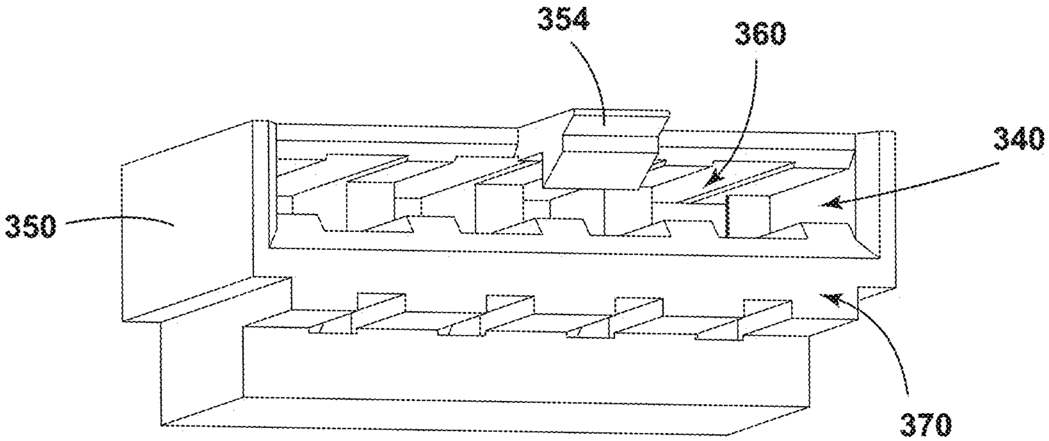

With reference to FIGS. 18-21, the second portion 352 of housing 310 includes a plurality of projections 390. In some examples, the second portion 352 is configured for connection with the second end 372 of the first portion 350 such that, in the assembled configuration, a projection 390 of the second portion 352 is disposed in a corresponding channel 362 of the first portion. Referring now to FIGS. 18 and 19, in the assembled configuration, a spring terminal 130 is restricted from moving out of a channel 362 at least in part via an inner tab 380 of the first portion 350 and/or a projection 390 of the second portion 352.

Figure 24:
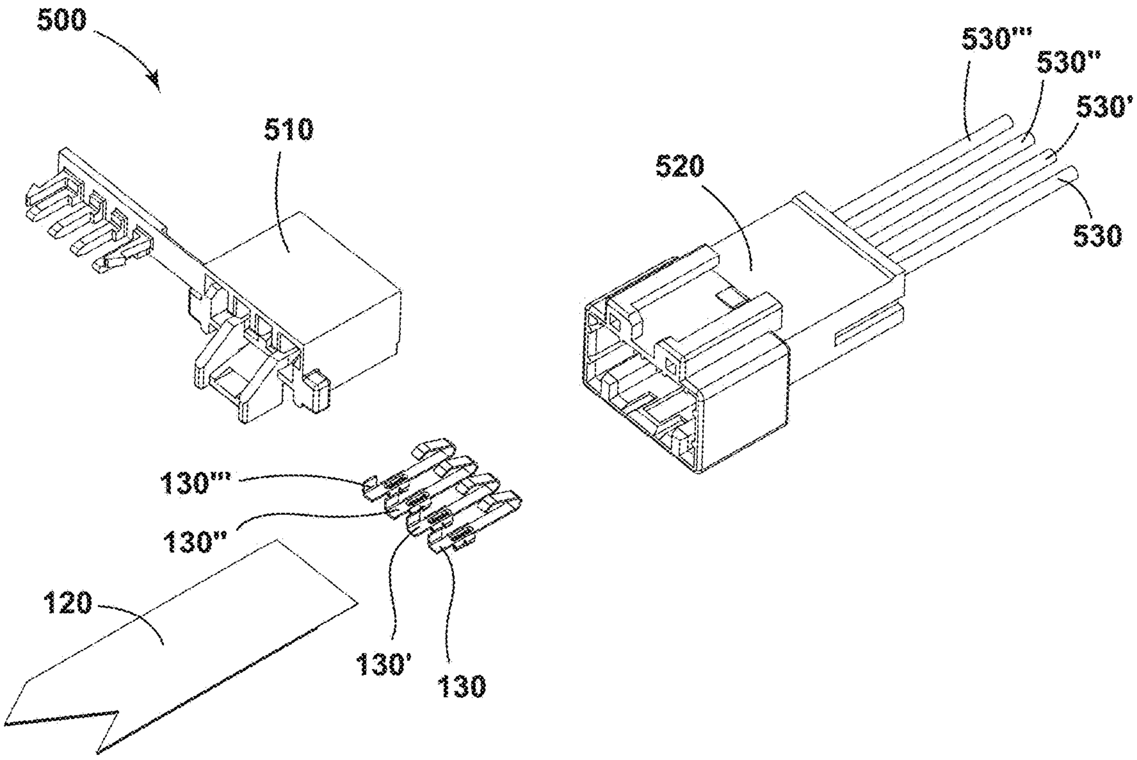
FIG. 24 is an exploded perspective view generally illustrating an embodiment of an electrical assembly according to teachings of the present disclosure.
Figure 25:
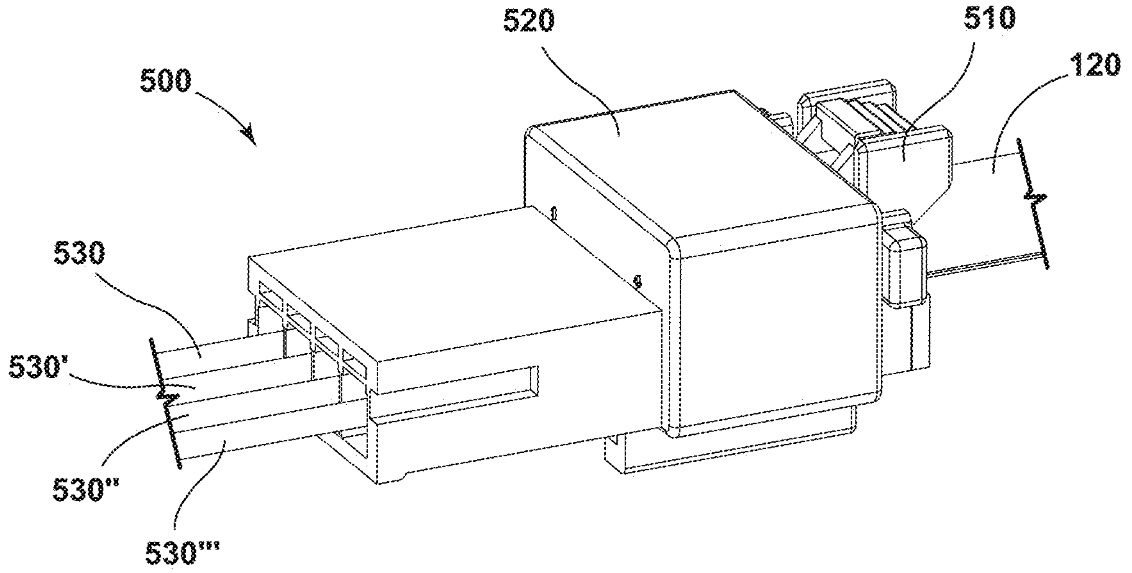
FIG. 25 is a perspective view generally illustrating an embodiment of an electrical assembly according to teachings of the present disclosure.
Figure 26:
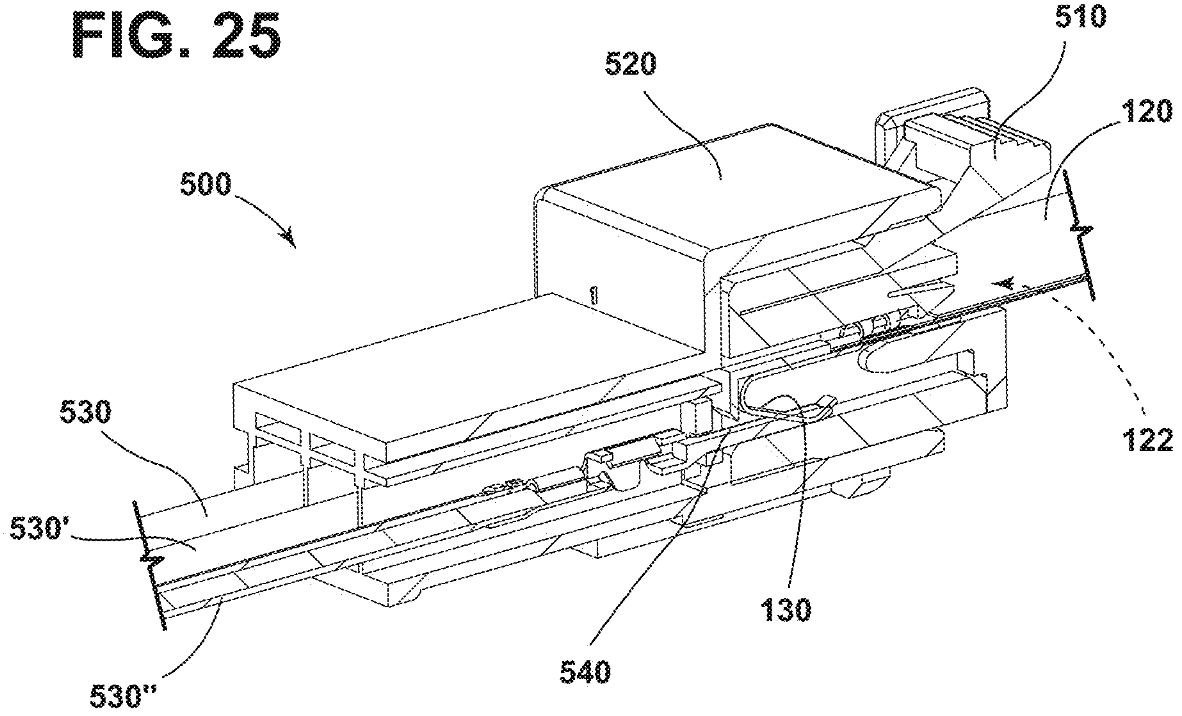
FIG. 26 is a cross-sectional perspective view generally illustrating an embodiment of an electrical assembly according to teachings of the present disclosure.

FIGS. 24-26 present an electrical assembly 500 including a first housing 510, a second housing 520, a flat cable 120, a plurality of spring terminals 130 (e.g., spring terminals 130, 130', 130'', 130'''), and/or a plurality of electrical wires 530 (e.g., electrical wires 530, 530', 530'', 530''') each including a terminal 540. The structure and function of the electrical assembly 500 may include features that are substantially similar to that of the electrical assembly 100 and/or the electrical assembly 300. Accordingly, the structure and/or function of such similar features will not be described again in detail. The first housing 510 is configured for connection with a flat cable 120 and/or the second housing 520. The second housing 520 is configured for connection with the electrical wires 530 and/or the first housing 510. In some implementations, the first housing 510 is formed separately from the second housing 520 and is inserted at least partially into the second housing 520 during assembly.

Figure 30:
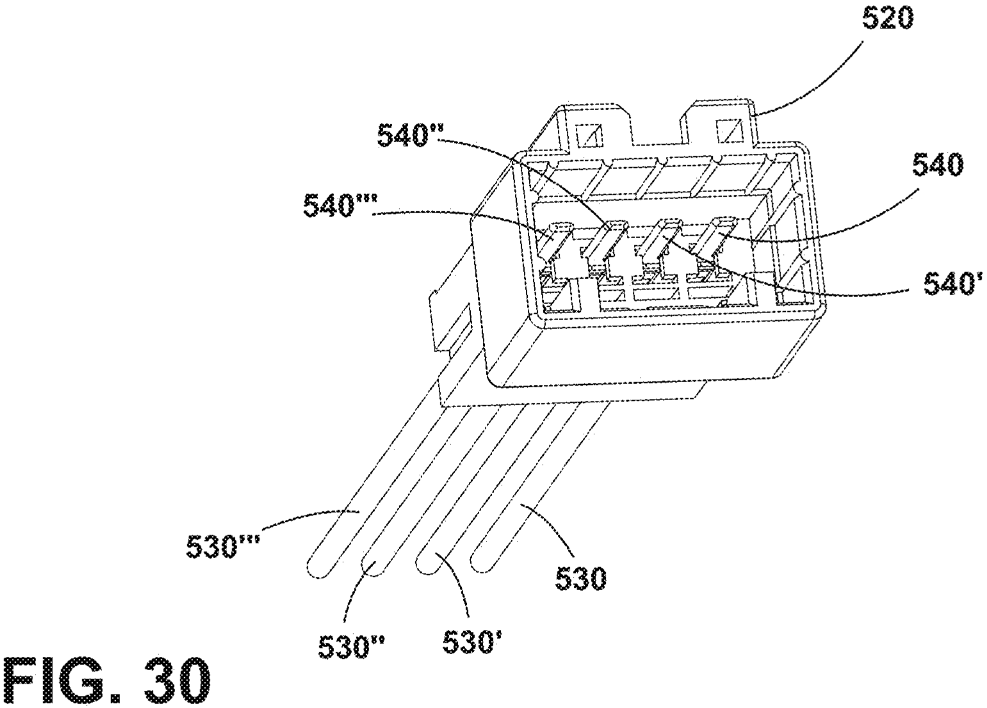
FIGS. 30 and 31 are perspective views generally illustrating an embodiment of a second housing of an electrical assembly according to teachings of the present disclosure.
Figure 31:
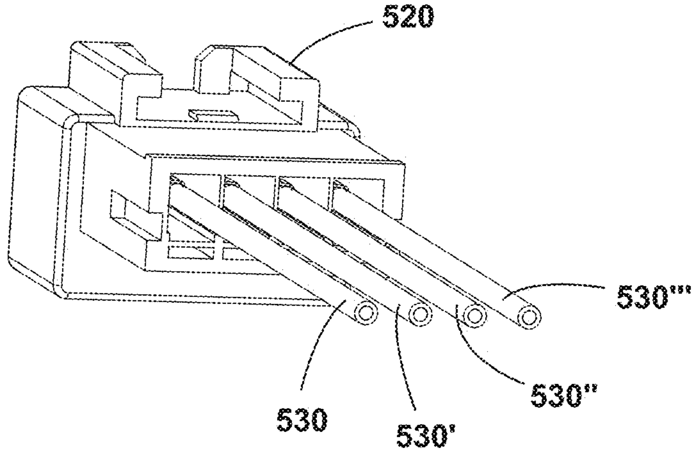

Referring now to FIGS. 30 and 31, an electrical wire 530 may include a round solid wire or a stranded wire, among others. A terminal 540 is connected to each electrical wire 530. A terminal 540 includes an electrically conductive material. In some implementations, a terminal 540 includes a different configuration than a spring terminal 130. For example and without limitation, a terminal 540 may include a barrel crimp terminal. In an assembled configuration, a portion of the flat cable 120 and the spring terminals 130 are disposed in the first housing 510, and/or the terminals 540 and portions of the electrical wires 530 are disposed in the second housing 520 (see, e.g., FIG. 30). The first housing 510 is connected to the second housing 520 such that a spring terminal 130 is in contact with a terminal 540 and that an electrical conductor 122 of the flat cable 120 is electrically connected to an electrical wire 530 (see, e.g., FIG. 26). The electrical assembly 500 is shown including four spring terminals 130 and four electrical wires 530, however the electrical assembly 500 may include more or less than four spring terminals 130 and/or more or less than four electrical wires 530.

Figure 27:
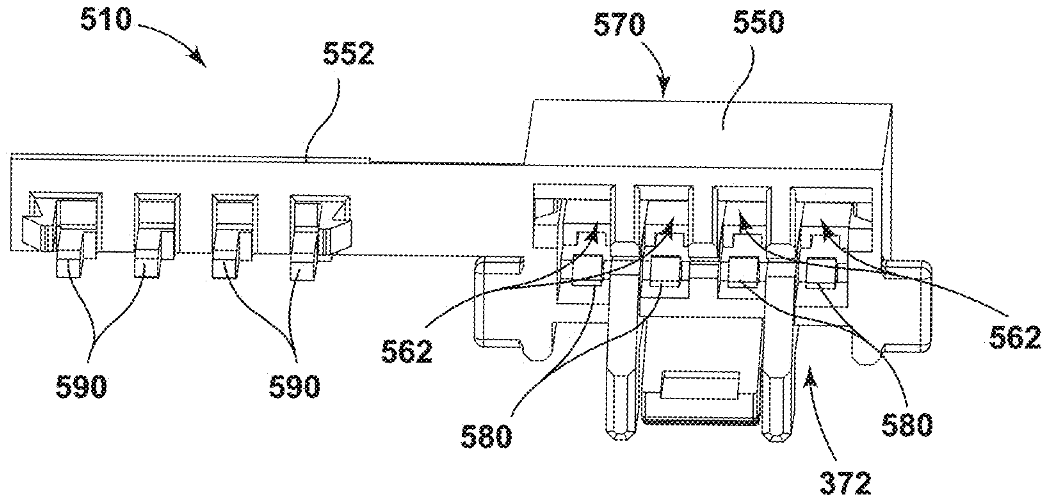
FIGS. 27-29 are perspective views generally illustrating an embodiment of a first housing of an electrical assembly according to teachings of the present disclosure.
Figure 28:
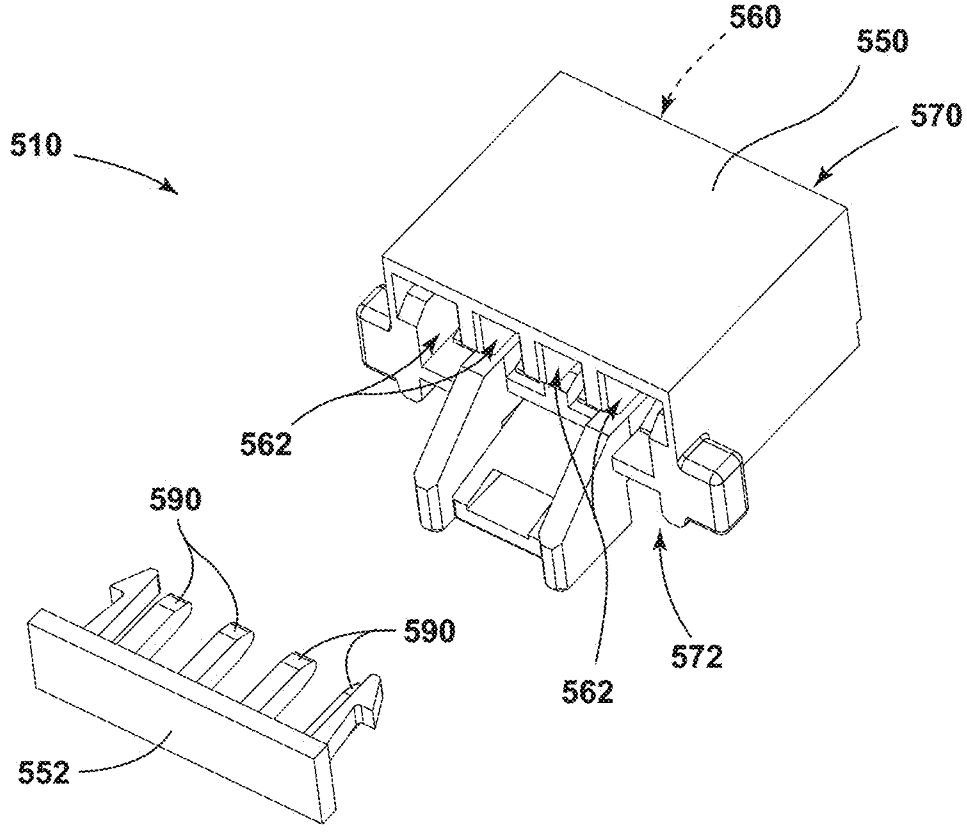
Figure 29:
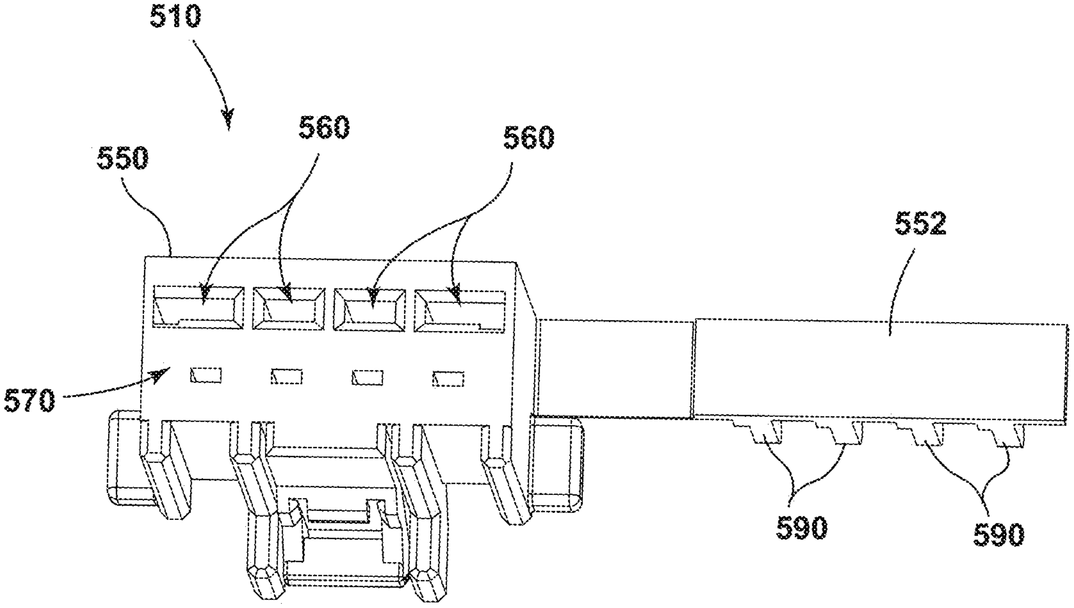

With reference to FIGS. 27-29, in some example configurations, a first housing 510 includes a first portion 550 and a second portion 552. The first portion 550 is configured for connection with the flat cable 120 and/or the second portion 552. The second portion 552 is configured for connection with the first portion 550. In some instances, the second portion 552 is formed integrally with the first portion 550 (see, e.g., FIGS. 27 and 29). In other instances, the second portion 552 is a separate component from the first portion 550 (see, e.g., FIG. 28). The first portion 550 includes a plurality of slots 560 accessible via a first end 570 of the first portion 550 and/or a plurality of channels 562 accessible via a second end 572 of the first portion 550. A slot 560 receives a portion of a terminal 540. A channel 562 receives a spring terminal 130, a portion of the flat cable 120, and/or a part of the second portion 552 of the first housing 510. The first portion 510 includes a plurality of inner tabs 580. An inner tab 580 is disposed in each channel 562. The first portion 550 is shown including four channels 562 and four inner tabs 580, however the first portion 550 may include more or less than four channels 562 and/or more or less than four inner tabs 580. The second portion 552 of first housing 510 includes a plurality of projections 590. In some examples, the second portion 552 is configured for connection with the second end 572 of the first portion 550 such that, in the assembled configuration, a projection 590 is disposed in a corresponding channel 562. In the assembled configuration, a spring terminal 130 is restricted from moving out of a channel 562 at least in part via an inner tab 580 of the first portion 550 and/or a projection 590 of the second portion 552.

Figure 32:
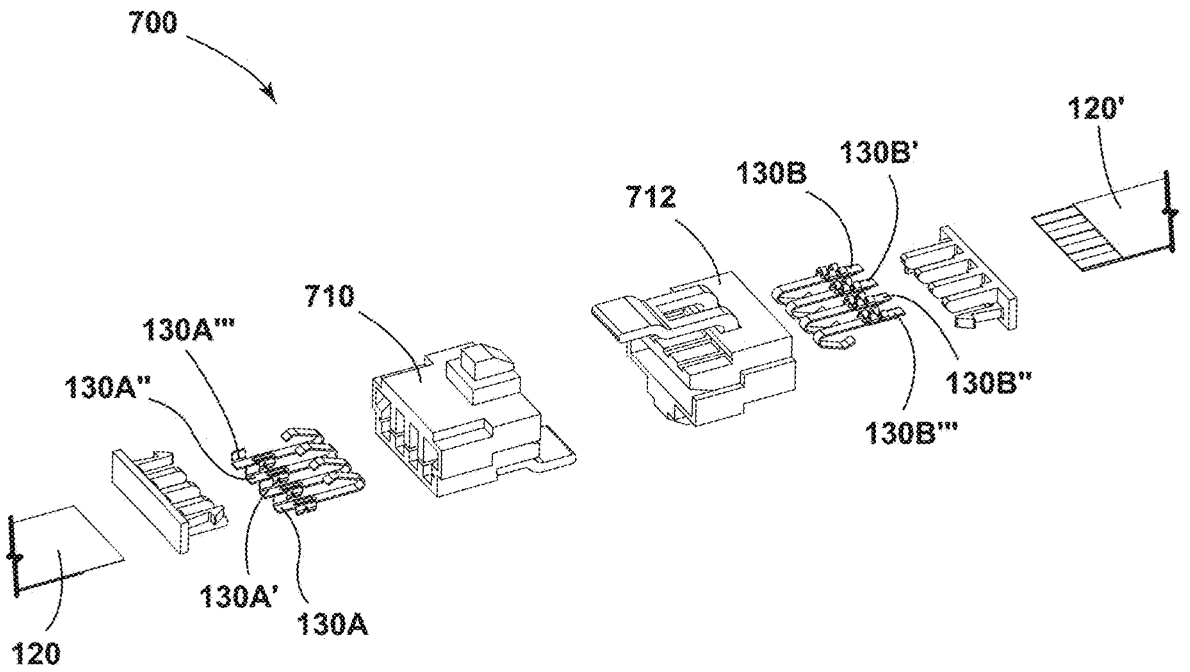
FIG. 32 is an exploded perspective view generally illustrating an embodiment of an electrical assembly according to teachings of the present disclosure.
Figure 33:
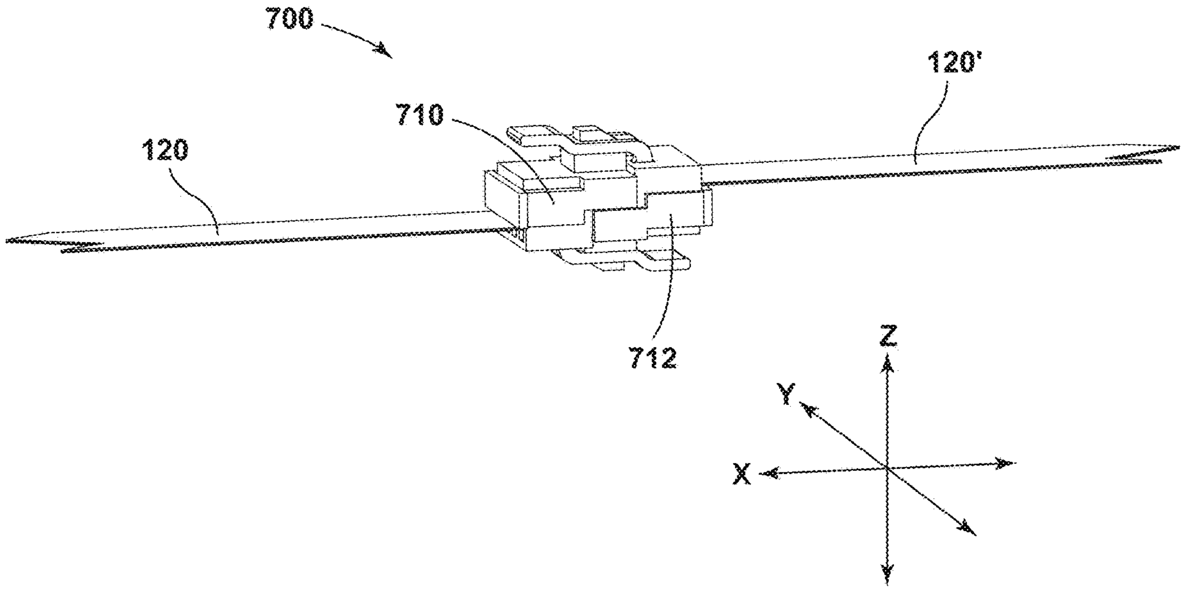
FIG. 33 is a perspective view generally illustrating an embodiment of an electrical assembly according to teachings of the present disclosure.

FIGS. 32 and 33 present an electrical assembly 700 including a first housing 710, a second housing 712, a flat cable 120, a second flat cable 120', a plurality of first spring terminals 130A (e.g., spring terminals, 130A, 130A', 130A", 130A"') connected to the flat cable 120, and/or a plurality of second spring terminals 130B (e.g., 130B, 130B', 130B", 130B"') connected to the second flat cable 120'. The electrical assembly 700 may include features that are substantially similar to that of the electrical assembly 100, the electrical assembly 300, and/or the electrical assembly 500. Accordingly, the structure and/or function of such similar features will not be described again in detail.

The first housing 710 is configured for connection with a first flat cable 120 and/or the second housing 712. The second housing 712 is configured for connection with the second flat cable 120' and/or the first housing 710. In an assembled configuration, a portion of the flat cable 120 and the first spring terminals 130A are disposed in the first housing 710, and/or a portion of the second cable 120' and the second spring terminals 130B are disposed in the second housing 712. A first spring terminal 130A is electrically connected to an electrical conductor 122 of the flat cable 120, and/or a second spring terminal 130B is electrically connected to a second electrical conductor 122' of the second flat cable 120'. The housing 710 is connected with the second housing 712 such that a spring terminal 130A is in contact with a second spring terminal 130B, and the electrical conductor 122 of the flat cable 120 is electrically connected to the second electrical conductor 122' of the second flat cable 120'. The assembly 700 is shown having four first spring terminals 130A and four second spring terminals 130B, however the assembly 700 may include more or less than four first spring terminals 130A and/or more or less than four second spring terminals 130B.

In some embodiments, the second housing 712 includes an identical configuration as the housing 710. For example and without limitation, a housing 710 may be reversible such that the housing 710 is configured to mate with a second housing 712 having the same configuration to electrically connect the flat cable 120 with the second flat cable 120'. In some configurations, the second housing 712 may be rotated 180 degrees about and X-axis and 180 degrees about a Y-axis relative to housing 710, and then mated with the housing 710 such that portions of the housings 710, 712 are inserted into each other and/or such that one or more portions/walls are flush (see, e.g., FIG. 33). Embodiments of the housing 710 are described below, but the second housing 712 may include some or all of the same or similar features.

Figure 34:
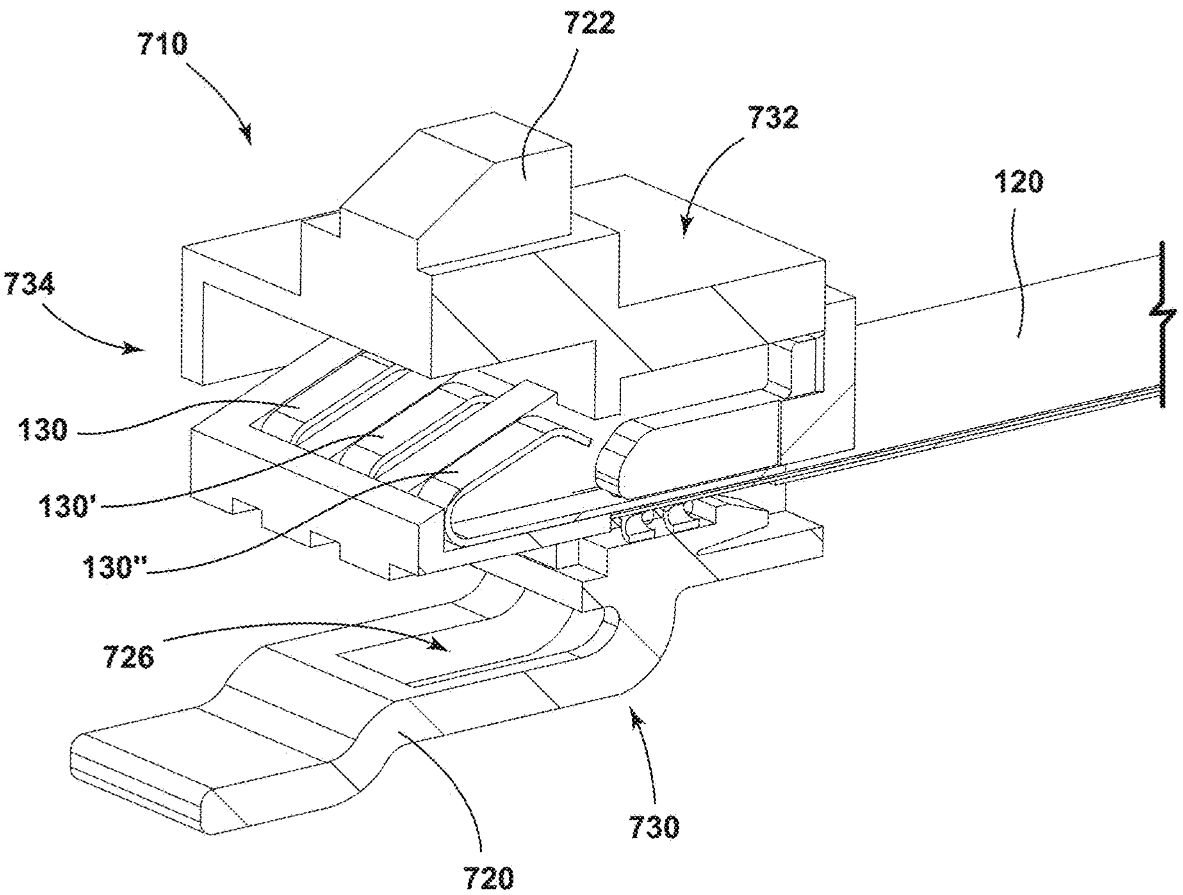
FIG. 34 is a cross-sectional perspective views generally illustrating an embodiment of an electrical assembly according to teachings of the present disclosure.
Figure 35:
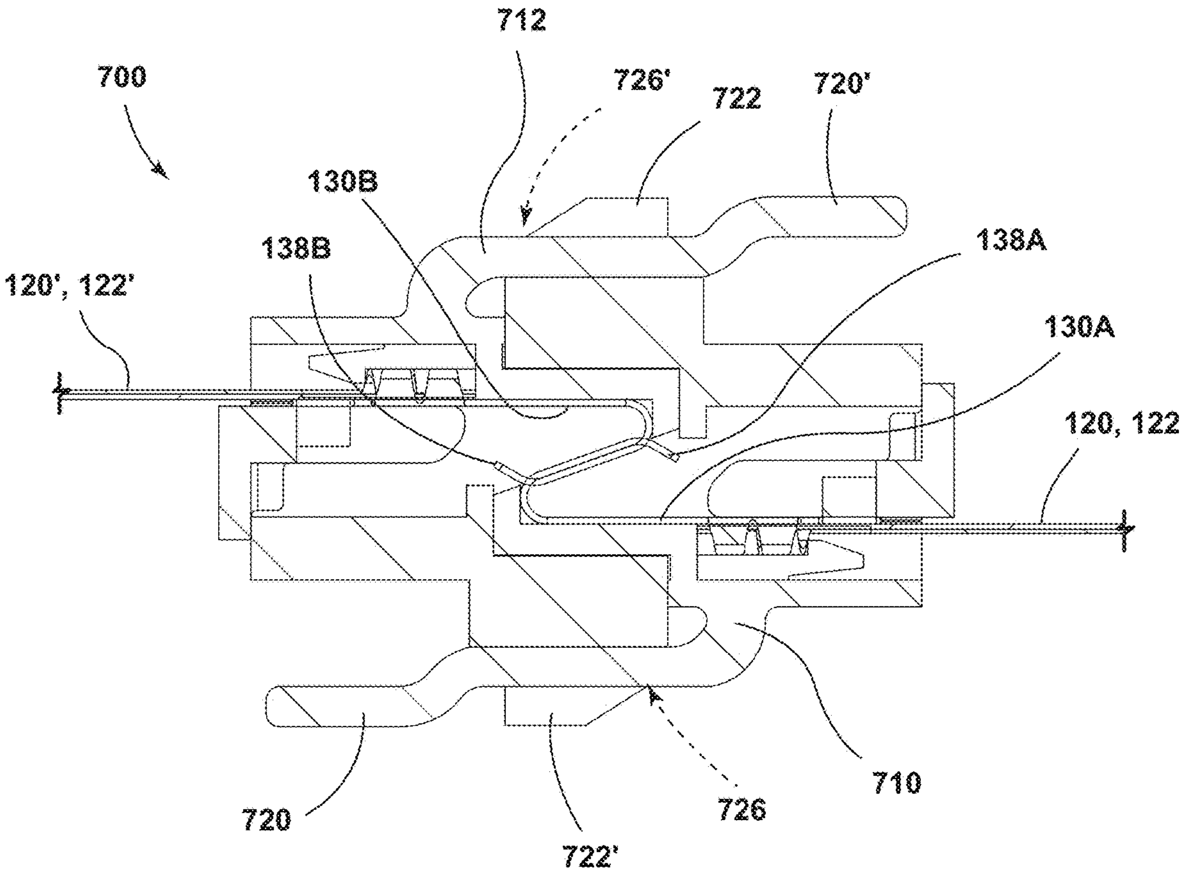
FIG. 35 is a cross-sectional view generally illustrating an embodiment of an electrical assembly according to teachings of the present disclosure.

With reference to FIGS. 34 and 35, a housing 710 includes a latch 720 and/or a protrusion 722. In some implementations, the latch 720 extends from a first side 730 of the housing 710. The latch 720 includes a void 726. The protrusion 722 extends from a second side 732 of the housing 710 that is opposite the first side 730. The spring terminals 130 are accessible via a third side 734 (e.g., a front side) of the housing 710. In the assembled configuration, the housing 710 is connected to the second housing 712 such that a protrusion 722 of the housing 710 is partially disposed in a void 726' of a latch 720' of the second housing 712, a second protrusion 722' of the second housing 712 is partially disposed in a void 726 of a latch 720 of the housing 710, and/or a spring terminal 130A (e.g., spring portion 138A) of the housing 710 is in contact with a spring terminal 130B (e.g., second spring portion 138B) of the second housing 712 (see, e.g., FIG. 35).

This disclosure includes, without limitation, the following embodiments:

1. An assembly, comprising: a housing; a flat cable disposed at least partially in the housing and including an electrical conductor; a spring terminal disposed at least partially in the housing and including: a base; a first wing extending from the base in a first direction; a second wing spaced apart from the first wing; a spring portion extending from the base in a second direction; and a tab extending from the base; wherein the first wing and the second wing extend through the flat cable such that the spring terminal is electrically connected to the electrical conductor; and the spring portion connects with an external electrical component such that the external electrical component is electrically connected to the electrical conductor.
2. The assembly according to embodiment 1, wherein: the spring portion extends from a first end of the base; the spring portion includes a first curved portion, a planar portion, and a second curved portion; and the planar portion is disposed between the first curved portion and the second curved portion.
3. The assembly according to embodiment 1 or 2, wherein the tab is disposed proximate a second end of the base.
4. The assembly according to any preceding embodiment, wherein the tab includes a rectangular configuration; the tab extends perpendicular to the base; and the tab is not crimped.
5. The assembly according to any preceding embodiment, wherein the first wing and the second wing are disposed axially between the spring portion and the tab; the housing includes a recess; and the first wing and the second wing are disposed at least partially in the recess such that axial movement of the spring terminal relative to the housing is restricted.
6. The assembly according to any preceding embodiment, wherein the spring terminal includes a third wing disposed adjacent to the first wing and a fourth wing spaced apart from the third wing; and the third wing and the fourth wing extend through the flat cable.
7. The assembly according to any preceding embodiment, wherein the base includes a protrusion that extends toward the first wing and the second wing; the base includes a recess that corresponds to the protrusion; and the recess is disposed on an opposite side of the base as the protrusion.
8. The assembly according to any preceding embodiment, wherein the housing includes a first cover and a second cover; the assembly includes a second spring terminal and a busbar; and the busbar electrically connects the spring terminal with the second spring terminal.
9. The assembly according to any preceding embodiment, wherein the busbar is connected with the first cover.
10. The assembly according to any preceding embodiment, wherein the first cover and the second cover collectively define an internal cavity; and the busbar, the spring terminal, the second spring terminal, and a portion of the flat cable are disposed in the internal cavity.

11. The assembly according to any of embodiments 1-7, including a circuit board having an electrical component and an exposed conductor electrically connected to the electrical component; wherein the spring terminal is in contact with the exposed conductor of the circuit board such that the electrical conductor of the flat cable is electrically connected to the electrical component via the spring terminal.
12. The assembly according to any of embodiments 1-7 and 11, wherein the housing includes an internal cavity; and a portion of the circuit board, the spring terminal, and a portion of the flat cable are disposed in the internal cavity.
13. The assembly according to any of embodiments 1-7, 11, and 12, wherein the housing includes a projection/latch; and the projection/latch is at least partially disposed in a recess of the circuit board.
14. The assembly according to any of embodiments 1-7, including a second housing formed separately from the housing: an electrical wire; and a terminal connected to the electrical wire; wherein the terminal and a portion of the wire are disposed in the second housing
15. The assembly according to any of embodiments 1-7 and 14, wherein the second housing is connected to the housing such that the spring terminal is in contact with the terminal, and the electrical conductor of the flat cable is electrically connected to the electrical wire.
16. The assembly according to any of embodiments 1-7, 14, and 15, wherein the spring terminal has a different configuration than the terminal.
17. The assembly according to any of embodiments 1-7, including a second housing; a second flat cable disposed at least partially in the second housing and including a second electrical conductor; and a second spring terminal electrically connected to the second electrical conductor.
18. The assembly according to any of embodiments 1-7 and 17, wherein the second housing is connected to the housing such that the spring terminal is in contact with the second spring terminal, and the conductor of the flat cable is electrically connected to the second conductor of the second flat cable.
19. The assembly according to any of embodiments 1-7, 17, and 18, wherein the second spring terminal is identical to first spring terminal.
20. The assembly according to any of embodiments 1-7 and 17-19, wherein the second housing is identical to the housing.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. An assembly, comprising:

a housing;

a flat cable disposed at least partially in the housing and including an electrical conductor;

a spring terminal disposed at least partially in the housing and including:

a base;

a first wing extending from the base in a first direction;

a second wing spaced apart from the first wing;

a spring portion extending from the base in a second direction; and a tab extending from the base;

wherein the first wing and the second wing extend through the flat cable such that the spring terminal is electrically connected to the electrical conductor; and the spring portion connects with an external electrical component such that the external electrical component is electrically connected to the electrical conductor.

2. The assembly of claim 1, wherein:

the spring portion extends from a first end of the base;

the spring portion includes a first curved portion, a planar portion, and a second curved portion; and the planar portion is disposed between the first curved portion and the second curved portion.

3. The assembly of claim 2, wherein the tab is disposed proximate a second end of the base.

4. The assembly of claim 1, wherein:

the tab includes a rectangular configuration;

the tab extends perpendicular to the base; and the tab is not crimped.

5. The assembly of claim 1, wherein the first wing and the second wing are disposed axially between the spring portion and the tab;

the housing includes a recess; and the first wing and the second wing are disposed at least partially in the recess such that axial movement of the spring terminal relative to the housing is restricted.

6. The assembly of claim 1, wherein the spring terminal includes a third wing disposed adjacent to the first wing and a fourth wing spaced apart from the third wing; and the third wing and the fourth wing extend through the flat cable.

7. The assembly of claim 1, wherein:

the base includes a protrusion that extends toward the first wing and the second wing;

the base includes a recess that corresponds to the protrusion; and the recess is disposed on an opposite side of the base as the protrusion.

8. The assembly of claim 1, wherein:

the housing includes a first cover and a second cover;

the assembly includes a second spring terminal and a busbar; and the busbar electrically connects the spring terminal with the second spring terminal.

9. The assembly of claim 8, wherein the busbar is connected with the first cover.

10. The assembly of claim 8, wherein the first cover and the second cover collectively define an internal cavity; and the busbar, the spring terminal, the second spring terminal, and a portion of the flat cable are disposed in the internal cavity.

11. The assembly of claim 1, including a circuit board having an electrical component and an exposed conductor electrically connected to the electrical component;

wherein the spring terminal is in contact with the exposed conductor of the circuit board such that the electrical conductor of the flat cable is electrically connected to the electrical component via the spring terminal.

12. The assembly of claim 11, wherein the housing includes an internal cavity; and a portion of the circuit board, the spring terminal, and a portion of the flat cable are disposed in the internal cavity.

13. The assembly of claim 11, wherein the housing includes a projection/latch; and the projection/latch is at least partially disposed in a recess of the circuit board.

14. The assembly of claim 1, including:

a second housing formed separately from the housing:

an electrical wire; and a terminal connected to the electrical wire;

wherein the terminal and a portion of the wire are disposed in the second housing.

15. The assembly of claim 14, wherein the second housing is connected to the housing such that the spring terminal is in contact with the terminal, and the electrical conductor of the flat cable is electrically connected to the electrical wire.

16. The assembly of claim 15, wherein the spring terminal has a different configuration than the terminal.

17. The assembly of claim 1, including:

a second housing;

a second flat cable disposed at least partially in the second housing and including a second electrical conductor; and a second spring terminal electrically connected to the second electrical conductor.

18. The assembly of claim 17, wherein the second housing is connected to the housing such that the spring terminal is in contact with the second spring terminal, and the conductor of the flat cable is electrically connected to the second conductor of the second flat cable.

19. The assembly of claim 18, wherein the second spring terminal is identical to first spring terminal.

20. The assembly of claim 19, wherein the second housing is identical to the housing.

* * * * *